(12) United States Patent
Harada

(10) Patent No.: US 11,123,940 B2
(45) Date of Patent: Sep. 21, 2021

(54) SERVO PRESS MACHINE AND SETTING METHOD FOR SERVO PRESS MACHINE

(71) Applicant: AIDA ENGINEERING, LTD., Kanagawa (JP)

(72) Inventor: Yasuhiro Harada, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 128 days.

(21) Appl. No.: 16/356,744

(22) Filed: Mar. 18, 2019

(65) Prior Publication Data

US 2019/0291375 A1    Sep. 26, 2019

(30) Foreign Application Priority Data

Mar. 23, 2018 (JP) .............................. JP2018-056929

(51) Int. Cl.
*B30B 15/00* (2006.01)
*B30B 15/14* (2006.01)
(Continued)

(52) U.S. Cl.
CPC ............ *B30B 15/148* (2013.01); *B30B 1/263* (2013.01); *B30B 1/266* (2013.01); *B30B 15/26* (2013.01); *G05B 19/416* (2013.01)

(58) Field of Classification Search
CPC ......... B30B 15/00; B30B 15/14; B30B 15/26; B30B 15/148; B30B 1/263; B30B 1/266;
(Continued)

(56) References Cited

U.S. PATENT DOCUMENTS 5,732,619 A    3/1998  Hata et al.
5,791,887 A    8/1998  Williams et al.
(Continued)

FOREIGN PATENT DOCUMENTS

CN    1209862 A    3/1999
CN    1958279 A    5/2007
(Continued)

OTHER PUBLICATIONS

Extended European Search Report issued in corresponding European Patent Application No. 19161133.4-1019, dated Sep. 2, 2019.
(Continued)

*Primary Examiner* — Adam J Eiseman
*Assistant Examiner* — Chastin M. Brundidge
(74) *Attorney, Agent, or Firm* — McDermott Will & Emery LLP

(57) ABSTRACT

A servo press machine includes a display unit that displays a strip-shaped region for setting a motion of a slide and an operation unit that receives an input operation. A range extending from an upper end of the strip-shaped region to a lower end thereof corresponds to a movement range of the slide in a linear movement, and the strip-shaped region is formed of a plurality of slide operation regions that are consecutive in a direction in which the strip-shaped region extends. Each of the slide operation regions can set a speed of the slide in response to the input operation received by the operation unit, and a boundary between adjacent two of slide operation regions can move along the direction in which the strip-shaped region extends in response to the input operation received by the operation unit.

11 Claims, 21 Drawing Sheets

(51) Int. Cl.
*B30B 1/26* (2006.01)
*B30B 15/26* (2006.01)
*G05B 19/416* (2006.01)

(58) Field of Classification Search
CPC ........ G05B 19/416; G05B 2219/45143; G06F 3/04847; G06F 3/04842; G06F 3/0481; G06F 3/0482; G06F 9/451
USPC .......................................................... 700/17
See application file for complete search history.

(56) References Cited

U.S. PATENT DOCUMENTS

| | | |
|---|---|---|
| D429,700 S | 8/2000 | Liebig |
| D678,098 S | 3/2013 | Saikawa et al. |
| 8,972,055 B1 | 3/2015 | Desai et al. |
| D781,736 S | 3/2017 | Friedli |
| D826,297 S | 8/2018 | Yan et al. |
| D826,999 S | 8/2018 | Yan et al. |
| D839,215 S | 1/2019 | Odegard |
| D840,355 S | 2/2019 | Simon |
| D859,596 S | 9/2019 | Lance et al. |
| D867,410 S | 11/2019 | Du et al. |
| D874,962 S | 2/2020 | Friedli |
| 11,034,118 B2 | 6/2021 | Koshimizu |
| 2007/0003214 A1* | 1/2007 | Toyoda ................ H04N 5/85 386/344 |

FOREIGN PATENT DOCUMENTS

| | | | | |
|---|---|---|---|---|
| CN | 102985896 A | * | 3/2013 | ............. G06F 3/017 |
| CN | 105867803 A | | 8/2016 | |
| JP | H0557500 A | | 3/1993 | |
| JP | H10137994 A | | 5/1998 | |
| JP | H11245098 A | | 9/1999 | |
| JP | 2000015495 A | | 1/2000 | |
| JP | 2003-260599 A | | 9/2003 | |
| JP | 2004-017098 A | | 1/2004 | |
| JP | 2004-58152 A | | 2/2004 | |
| JP | 2013-184222 A | | 9/2013 | |
| JP | 2014-054642 A | | 3/2014 | |
| KR | 10-20100009775 A | | 1/2010 | |
| KR | 101116735 B1 | | 3/2012 | |

OTHER PUBLICATIONS

Design U.S. Appl. No. 29/648,936, filed May 24, 2018.
Chinese Office Action issued in the corresponding Chinese Patent Application No. 201910221054.3 dated Jul. 5, 2021, with English machine translation.
Zhan et al., "Experimental Study on Control of Variable Speed Input Controllable Stamping Mechanism Based on PC" Journal of Shunde Polytechnic, vol. 13, No. 4, Oct. 2015, with English machine translation.

* cited by examiner

SERVO PRESS MACHINE AND SETTING METHOD FOR SERVO PRESS MACHINE

Japanese Patent Application No. 2018-056929, filed on Mar. 23, 2018, is hereby incorporated by reference in its entirety.

BACKGROUND OF THE INVENTION

The present invention relates to a servo press machine and a setting method for a servo press machine.

In a conventional servo press machine, the motion of a slide is set such that, e.g., the speed of the slide relative to the position of the slide is shown in the form of a table, and a numerical value is input to each of columns in the table (see JP-A-2014-54642, JP-A-2004-58152, and JP-A-2003-260599).

There is a problem in that it is difficult for an operator to intuitively image a slide motion produced by thus setting the motion. In a conventional motion setting interface such as a tabular interface, an input result depends on the imagination of an operator. As a result, the operator may set a motion different from the intended motion.

SUMMARY

The invention can provide a servo press machine and a setting method for a servo press machine which allow an operator to set the motion of a slide, while visually recognizing the slide motion after the setting.

According to a first aspect of the invention, there is provided a servo press machine that performs press working by using an eccentric mechanism that converts a rotary movement to a linear movement to convert rotation of a servo motor to a reciprocating linear movement of a slide, the servo press machine including:

a display unit that displays a strip-shaped region for setting a motion of the slide; and an operation unit that receives an input operation, a range that extends from an upper end of the strip-shaped region to a lower end of the strip-shaped region corresponding to a movement range of the slide in the linear movement, the strip-shaped region being formed of a plurality of slide operation regions that are consecutive in a direction in which the strip-shaped region extends, each of the slide operation regions being capable of setting a speed of the slide in response to the input operation received by the operation unit, and a boundary between adjacent two of the slide operation regions being capable of moving along the direction in which the strip-shaped region extends in response to the input operation received by the operation unit.

According to a second aspect of the invention, there is provided a method of setting a servo press machine that performs press working by using an eccentric mechanism that converts a rotary movement to a linear movement to convert rotation of a servo motor to a reciprocating linear movement of a slide, the method including:

performing an input operation on a strip-shaped region displayed on a display unit to move a boundary between two of a plurality of slide operation regions that are provided in the strip-shaped region, each of the slide operation regions being capable of setting a speed of the slide; and setting a height range of the slide that operates at a speed set for each of the slide operation regions.

DETAILED DESCRIPTION OF THE EMBODIMENT

Figure 1:
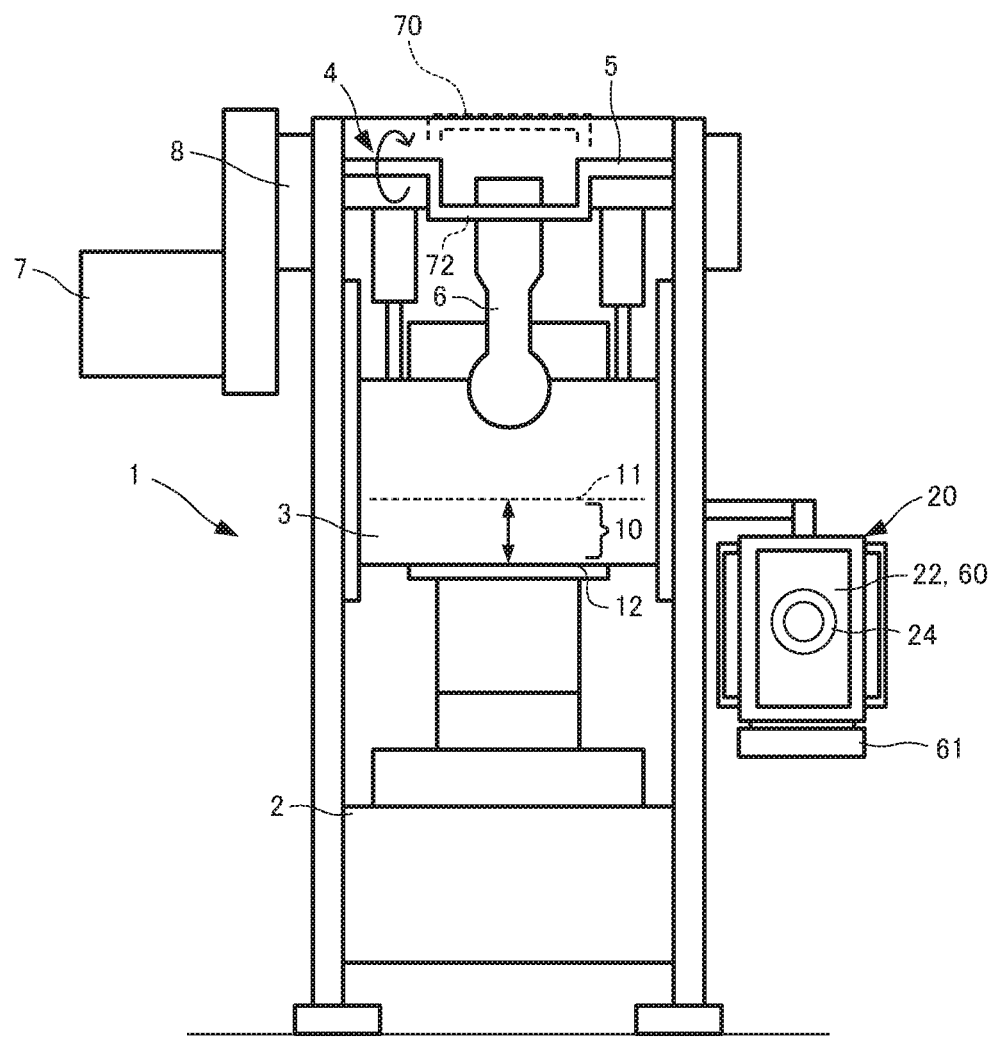
FIG. 1 is a front view illustrating a whole servo press machine according to an embodiment of the invention.

The invention was made in order to solve at least part of the problems described above and can be implemented as the following application examples.

Application Example 1

According to an application example of the invention, there is provided a servo press machine that performs press working by using an eccentric mechanism that converts a rotary movement to a linear movement to convert rotation of a servo motor to a reciprocating linear movement of a slide, the servo press machine including:

a display unit that displays a strip-shaped region for setting a motion of the slide; and an operation unit that receives an input operation, a range that extends from an upper end of the strip-shaped region to a lower end of the strip-shaped region corresponding to a movement range of the slide in the linear movement, the strip-shaped region being formed of a plurality of slide operation regions that are consecutive in a direction in which the strip-shaped region extends, each of the slide operation regions being capable of setting a speed of the slide in response to the input operation received by the operation unit, and a boundary between adjacent two of the slide operation regions being capable of moving along the direction in which the strip-shaped region extends in response to the input operation received by the operation unit.

In the servo press machine according to the above application example, by allowing the strip-shaped region to represent the movement range in the linear movement of the slide, an operator is allowed to set the motion of the slide, while visually recognizing the slide motion after the setting. In addition, by allowing the speed of the slide to be set for each of the plurality of slide operation regions and allowing the boundary between the slide operation regions to be moved, the operator is allowed to perform the input operation, while visually recognizing the motion of the slide, resulting in an improved operability.

Application Example 2

In the servo press machine according to the above application example, the strip-shaped region may be represented by an annular image corresponding to a rotating operation of the eccentric mechanism and can be formed into an annular shape by arranging the slide operation regions each having an arc shape.

In the servo press machine according to the above application example, by allowing the strip-shaped region to be represented by the annular image corresponding to the rotating operation of a crankshaft as a typical eccentric mechanism, the operator is allowed to easily visually recognize the motion of the slide, resulting in an improved operability.

Application Example 3

In the servo press machine according to the above application example, in an initial state, the slide operation regions of the strip-shaped region may include two slide operation regions provided in a region extending from a top dead center to a bottom dead center and one slide operation region provided in a region extending from the bottom dead center to the top dead center, corresponding to a forward operation of the eccentric mechanism.

In the servo press machine according to the above application example, by allowing the strip-shaped region in the initial state to represent a motion generally used as the motion of the slide resulting from the forward operation of the eccentric mechanism, the operator is allowed to easily set the slide motion.

Application Example 4

In the servo press machine according to the above application example, in an initial state, the slide operation regions of the strip-shaped region may include two upper and lower slide operation regions corresponding to a forward/reverse motion of the eccentric mechanism, and the upper slide operation region may correspond to a range in which the slide does not operate.

In the servo press machine according to the above application example, by allowing the strip-shaped region in the initial state to represent a motion generally used as the motion of the slide resulting from the forward/reverse motion of the eccentric mechanism, the operator is allowed to easily set the slide motion.

Application Example 5

In the servo press machine according to the above application example, the strip-shaped region may be represented by one strip-shaped image, the image has both ends positioned away from each other and extends downward from one of the both ends to be bent upward at a lower end and reach the other end, the both ends correspond to an ascent limit of the slide, the lower end corresponds to a descent limit of the slide, and the lower end can have at least one of the slide operation regions which extends in a horizontal direction.

In the servo press machine according to the above application example, by using such an image of the strip-shaped region, the operator is allowed to set the motion of the slide in which the slide is temporarily stopped at the bottom dead center, while visually recognizing the slide motion.

Application Example 6

In the servo press machine according to the above application example, the strip-shaped region may be represented by adjacent two strip-shaped images, each of the images has one end corresponding to an ascent limit of the slide and the other end corresponding to a point of reversal at a position to which the slide has ascended through a descent limit thereof, and the two strip-shaped images can be combined together such that the respective other ends are adjacent to each other.

In the servo press machine according to the above application example, by using such an image of the strip-shaped region, the operator is allowed to set a so-called two-passes-through-bottom-dead-center motion of the slide, while visually recognizing the slide motion.

Application Example 7

In the servo press machine according to the above application example, the number of the slide operation regions of the strip-shaped region may be allowed to be increased or decreased in response to the input operation received by the operation unit.

In the servo press machine according to the above application example, by increasing or decreasing the regions for the slide, it is possible to set a more complicated motion.

Application Example 8

In the servo press machine according to the above application example, the speed of the slide in each of the slide operation regions may be set by changing a width of the slide operation region in accordance with the input operation received by the operation unit.

In the servo press machine according to the above application example, by allowing the width of the slide operation region to correspond to the set speed of the slide, the operator is allowed to set the motion, while visually recognizing a speed change.

Application Example 9

In the servo press machine according to the above application example, the slide operation, region the width of which is changed, may be a region having the lower end as one end thereof.

In the servo press machine according to the above application example, the slide operation region, the width of which is changed, is the region having the lower end of the strip-shaped region as one end portion thereof. This allows a characteristic press motion in the vicinity of the bottom dead portion to be set.

Application Example 10

The servo press machine according to the above application example may further include a storage unit that stores a plurality of types of the strip-shaped regions, wherein the display unit may select one of the plurality of strip-shaped regions from the storage unit in response to the input operation received by the operation unit and display the selected strip-shaped region.

In the servo press machine according to the above application example, by preparing the plurality of strip-shaped regions in advance in the storage unit, it is possible to flexibly respond to the setting of a plurality of types of motions.

Application Example 11

In the servo press machine according to the above application example, the operation unit may be provided in the display unit, and the input operation received by the operation unit may be a touch operation.

In the servo press machine according to the above application example, by allowing the input operation to be performed by the touch operation, the operability is improved.

Application Example 12

According to an application example of the invention, there is provided a method of setting a servo press machine that performs press working by using an eccentric mechanism that converts a rotary movement to a linear movement to convert rotation of a servo motor to a reciprocating linear movement of a slide, the method including:

performing an input operation on a strip-shaped region displayed on a display unit to move a boundary between two of a plurality of slide operation regions that are provided in the strip-shaped region, each of the slide operation regions being capable of setting a speed of the slide; and setting a height range of the slide that operates at a speed set for each of the slide operation regions.

In accordance with the setting method for the servo press machine according to the above application example, by moving the boundary between the slide operation regions for each of which the speed of the slide is set, it is possible to set the height range of the slide corresponding to the slide operation region. This allows the operator to set the motion of the slide, while visually recognizing the slide motion after the setting.

The servo press machine according to the embodiment of the invention allows the operator to set the motion of the slide, while visually recognizing the slide motion after the setting. Also, the setting method for the servo press machine according to the embodiment of the invention allows the operator to set the motion of the slide, while visually recognizing the slide motion after the setting.

Embodiments of the invention are described in detail below with reference to the drawings. Note that the following embodiments do not unduly limit the scope of the invention as stated in the claims. In addition, all of the elements described in connection with the following embodiments should not necessarily be taken as essential requirements of the invention.

1. Outline of Servo Press Machine

Figure 2:
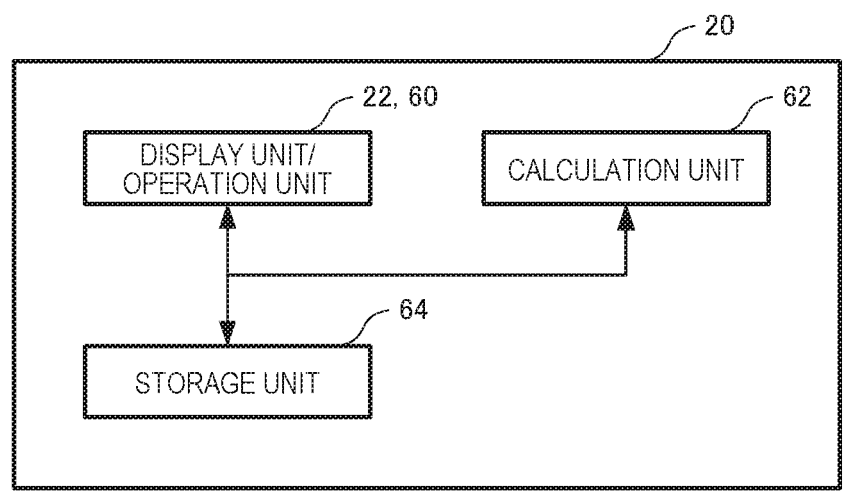
FIG. 2 is a block diagram of an operation panel of a servo press machine according to an embodiment of the invention.
Figure 3:
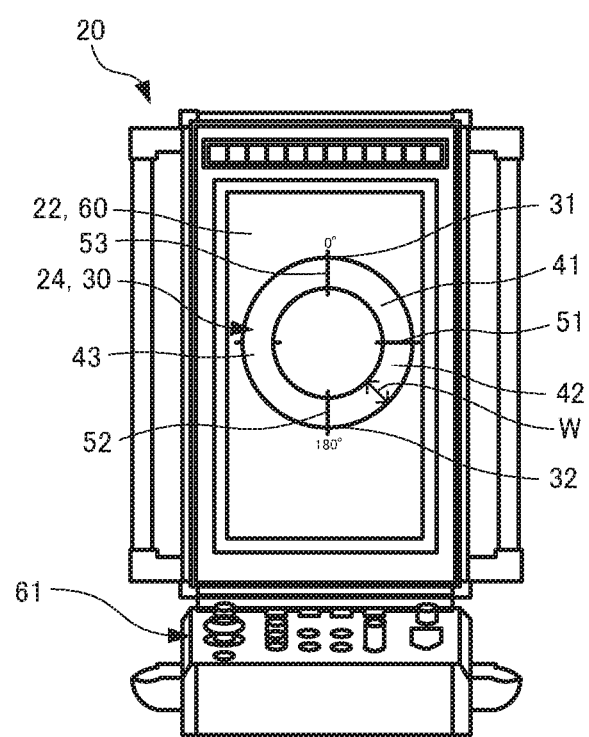
FIG. 3 is a front view of an operation panel of a servo press machine according to an embodiment of the invention.

An outline of a servo press machine (hereinafter referred to as the "press machine 1") will be described below, with reference to FIGS. 1 to 3. FIG. 1 is a front view illustrating the whole press machine 1 according to an embodiment of the invention. FIG. 2 is a block diagram of an operation panel 20 of the press machine 1. FIG. 3 is a front view of the operation panel 20 of the press machine 1.

As illustrated in FIG. 1, the press machine 1 uses an eccentric mechanism 4 which converts a rotary movement to a linear movement to convert the rotation of a servo motor 7 to a reciprocating linear movement of a slide 3 and performs press working.

The press machine 1 has the eccentric mechanism 4 having a crankshaft 5 and a connecting rod 6, a servo motor 7 which drives the eccentric mechanism 4, a decelerator 8 which connects the eccentric mechanism 4 and the servo motor 7, and the operation panel 20 which allows for various settings and operations on the press machine 1.

The servo motor 7 is an AC servo motor. The servo motor 7 is not limited to the AC servo motor. As the servo motor 7, an induction motor, a reluctance motor, a DC servo motor, or the like can be used.

The eccentric mechanism 4 is not limited to the crank mechanism using the crankshaft 5. As the eccentric mechanism 4, a crank mechanism having an eccentric shaft can be used. As the eccentric mechanism 4, a known slide drive mechanism used in the press machine 1, e.g., a booster mechanism using a knuckle mechanism, a link mechanism, or the like can also be used. Alternatively, a mechanism having an eccentric plate integrated with a main gear can also be used. The crankshaft 5 is driven by the servo motor 7 to rotate between a top dead center 70 (shown by the broken line in FIG. 1) and a bottom dead center 72.

To a bolster 2 and the slide 3, respective dies are fixed. The slide 3 connected to the lower end of the connecting rod 6 is caused to ascend or descend relative to the bolster 2 by the rotation of the crankshaft 5 driven by the servo motor 7. A movement range 10 in which the slide 3 ascends or descends in a vertical direction corresponds to a range between an ascent limit 11 (shown by the broken line in FIG. 1) and a descent limit 12.

The operation panel 20 includes a display unit 22 which displays a strip-shaped region 30 for allowing a motion of the slide 3 to be set and an operation unit 60 which receives an input operation. The operation panel 20 is attached to the press machine 1 and electrically connected thereto. The operation panel 20 allows an operator who operates the press machine 1 to carry out various settings and operations on the press machine 1.

The display unit 22 is a liquid crystal display (LCD). As the display unit 22, another known display device (such as, e.g., an organic electro luminescence (EL)) may also be used. On the display unit 22, various graphical user interfaces (GUIs) for the operator can be displayed.

The operation unit 60 is provided on the display unit 22. The operation unit 60 is a touch-panel operation unit provided integrally with the display unit 22 to allow the input operation on the operation unit 60 to be performed by a touch operation. The operator performs the input operation by the touch operation on the operation unit 60 on the display unit 22 to thus allow a displayed image 24 to be changed, resulting in an improved operability. The touch-panel operation unit allows an operation on the operation unit 60 to be performed by directly touching the display unit 22 with a finger or a pen. As a touch panel, a touch panel using a known method such as a resistance film method, an electrostatic capacitance method, a surface electrostatic capacitance method, or a projection electrostatic capacitance method can be used. The operation unit 60 is not limited to the touch-panel operation unit integrated with the display unit 22. The operation unit 60 may also be a panel detachable from the display unit 22 as long as an operation which changes the image 24 or the like displayed on the display unit 22 can be performed. Alternatively, as the operation unit 60, a known input means (such as, e.g., a mouse, a trackball, or a keyboard) provided separately from the display unit 22 may also be used.

The operation panel 20 includes a second operation unit 61 in which physical buttons to be operated by the operator and the like are disposed. The second operation unit 61 includes an input means which can be operated instead of the touch-panel operation unit 60 and an input means for receiving operations different from those received by the operation unit 60.

As illustrated in FIG. 2, the operation panel 20 includes a calculation unit 62 and a storage unit 64 which are electrically connected to the display unit 22 and the operation unit 60.

The calculation unit 62 is a central processing unit (CPU) and performs a press working process by executing a program stored in the storage unit 64. The calculation unit 62 allows the motion of the slide 3 to be set in accordance with operations performed by the operator on the operation unit 60 and the second operation unit 61 and also allows the motion of the slide 3 preliminarily stored in the storage unit 64 to be changed.

The storage unit 64 stores programs and set data for the press machine 1, e.g., motion data for the slide 3. The motion of the slide 3 can be represented by an operation curve of the slide 3 in one cycle. Typically, the motion of the slide 3 is represented by a slide position (stroke of the slide 3) (mm) of the slide 3 given as an ordinate and one cycle time (sec) given as an abscissa. The calculation unit 62 outputs an instruction to the servo motor 7 in accordance with the motion data stored in the storage unit 64. The servo motor 7 drives in accordance with the instruction to operate the slide 3 in accordance with the motion set in advance.

As illustrated in FIG. 3, the operation panel 20 has the display unit 22 and the operation unit 60 at the center of the front surface thereof, while having the second operation unit 61 below the display unit 22. On the display unit 22, the image 24 including the strip-shaped region 30 is displayed.

The range extending from an upper end 31 of the strip-shaped region 30 to a lower end 32 thereof corresponds to the movement range 10 of the linear movement of the slide 3. Accordingly, the upper end 31 corresponds to the top dead center 70 of the crankshaft 5, while the lower end 32 corresponds to the bottom dead center 72 of the crankshaft 5 (FIG. 1). Near the upper end 31 of the strip-shaped region 30, "0°" is displayed as the rotation angle of the crankshaft 5 while, near the lower end 32, "180°" is displayed as the rotation angle of the crankshaft 5. The width (breadth) of the strip-shaped region 30 corresponds to the speed of the slide 3, and a maximum width W of the strip-shaped region 30 represents the maximum speed of the slide 3. The speed of the slide 3 refers herein to an objective speed. The operation panel 20 gives an instruction to the servo motor 7 such that the slide 3 moves at the speed.

The strip-shaped region 30 is formed of a plurality of slide operation regions (which are a first slide operation region 41, a second slide operation region 42, and a third slide operation region 43 in FIG. 3) which are consecutive in the direction in which the strip-shaped region 30 extends. By allowing the strip-shaped region 30 to represent the movement range 10 of the linear movement of the slide 3, the operator is allowed set the motion of the slide 3, while visually recognizing the slide motion after the setting. For each of the slide operation regions (41, 42, and 43), the speed of the slide 3 can be set in accordance with an input operation on the operation unit 60.

Boundaries (a first boundary 51, a second boundary 52, and a third boundary 53) between the adjacent slide operation regions (the first and second slide operation regions 41 and 42, the second and third slide operation regions 42 and 43, and the third and first slide operation regions 43 and 41) can be moved along the direction in which the strip-shaped region 30 extends in accordance with the input operation on the operation unit 60. By allowing the speed of the slide 3 to be set for each of the slide operation regions (41, 42, and 43) and also allowing the boundaries (51, 52, and 53) between the slide operation regions (41, 42, and 43) to be moved, the operator is allowed to perform an input operation, while visually recognizing the motion of the slide 3, resulting in an improved operability.

The strip-shaped region 30 is represented by an annular image corresponding to the rotating operation of the eccentric mechanism 4. The strip-shaped region 30 is formed into an annular shape by arranging the plurality of slide operation regions (which are the first slide operation region 41, the second slide operation region 42, and the third slide operation region 43 in FIG. 3) each in the form of an arc. By allowing the strip-shaped region 30 to be represented by the annular image corresponding to the rotating operation of the eccentric mechanism 4, the operator easily visually recognizes the motion of the slide 3, resulting in an improved operability. The strip-shaped region 30 is not limited to the annular shape. Another form (such as a linear shape extending in the vertical direction or a horizontal direction, a V-shaped shape, or a U-shaped shape) can be used for the strip-shaped region 30.

The display unit 22 can display an image other than that of the strip-shaped region 30. Examples of the other image include images representing operation buttons.

2. Forward Operation

Figure 8:
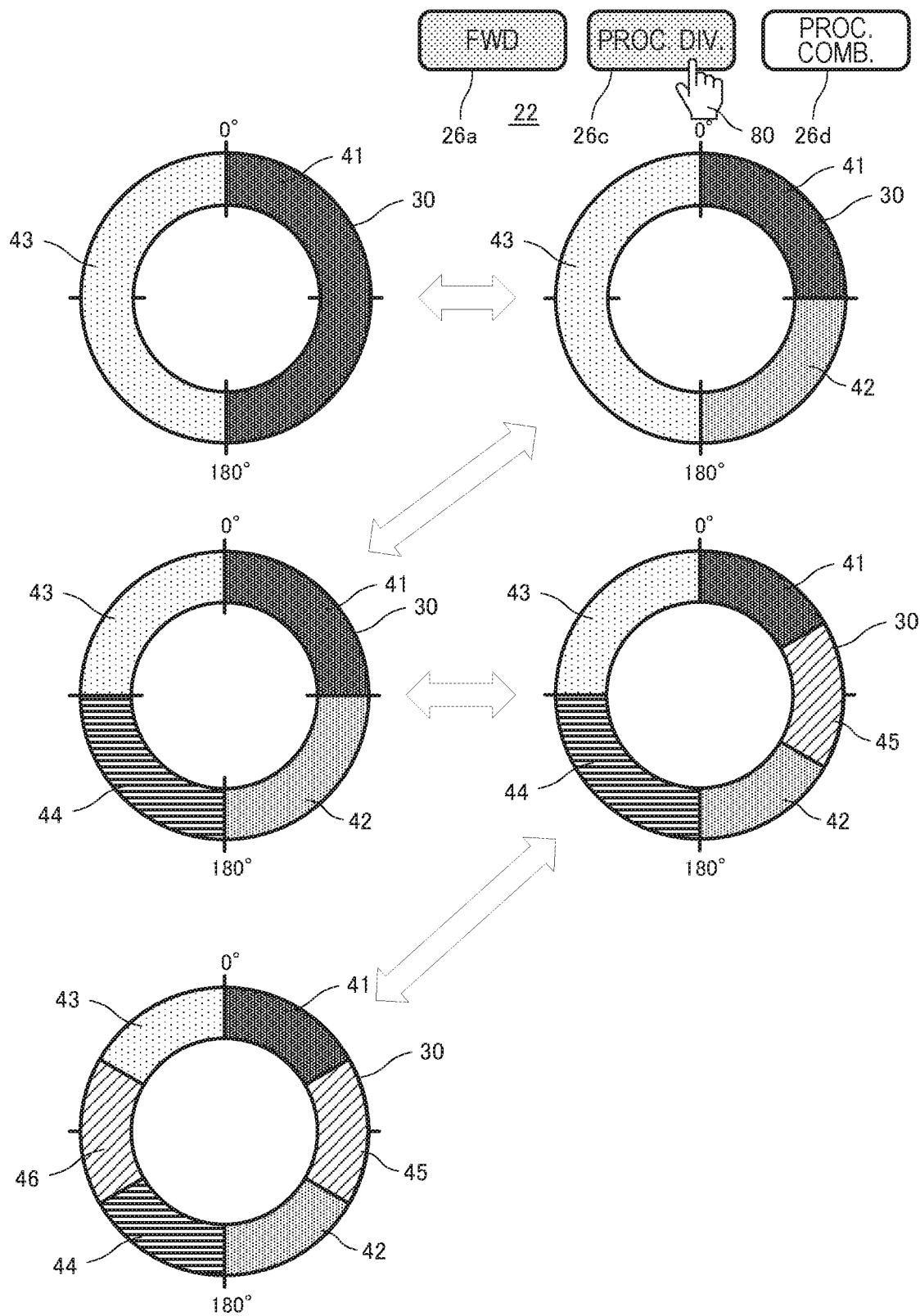
FIG. 8 is a diagram illustrating an operation of dividing a strip-shaped region which is displayed on a display unit of a servo press machine according to an embodiment of the invention.
Figure 9:
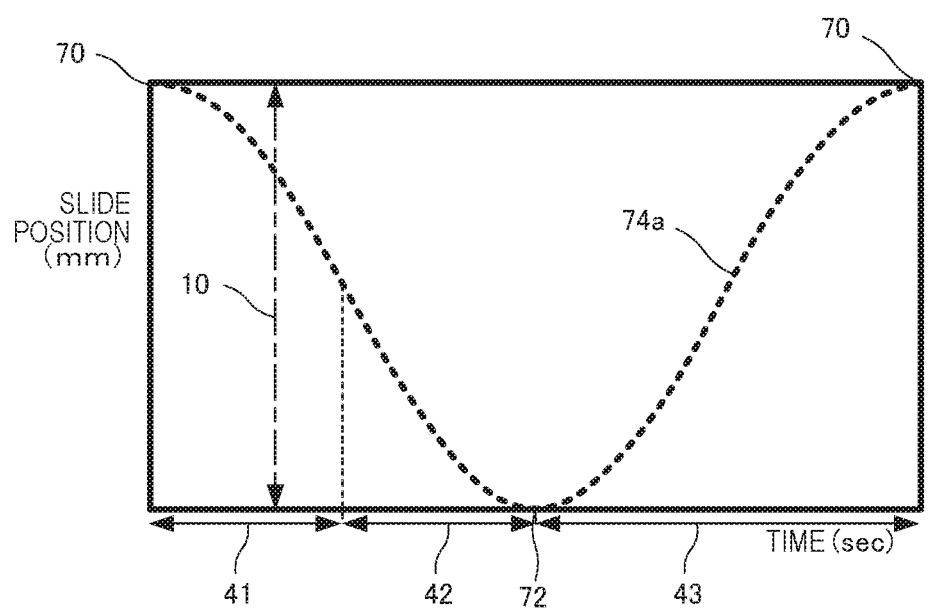
FIG. 9 is a diagram illustrating a motion of a slide in a forward operation of a servo press machine according to an embodiment of the invention.
Figure 10:
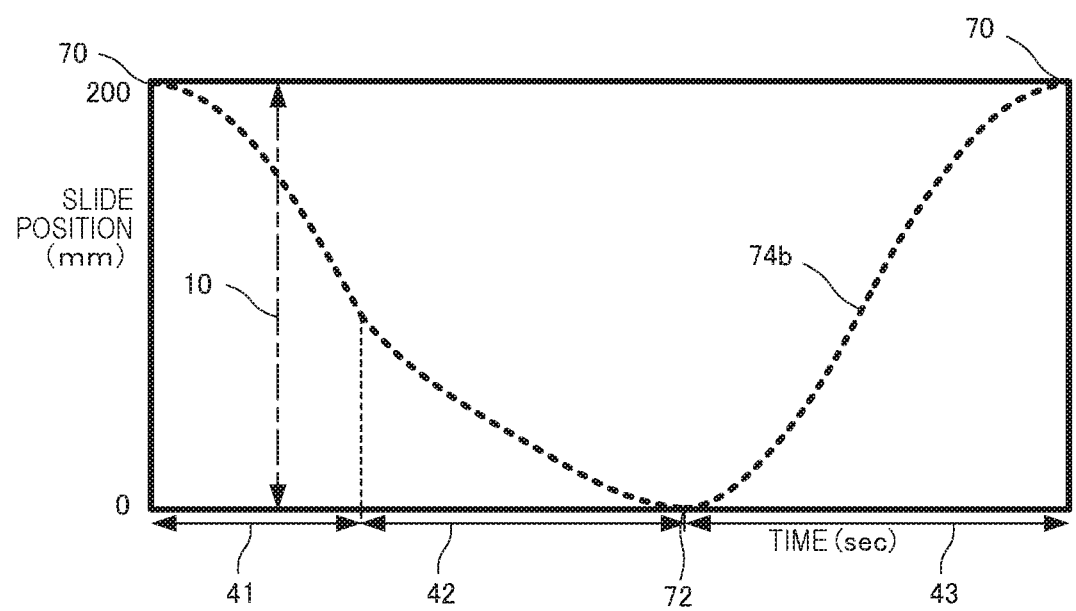
FIG. 10 is a diagram illustrating the motion of a slide in a forward operation of a servo press machine according to an embodiment of the invention.
Figure 11:
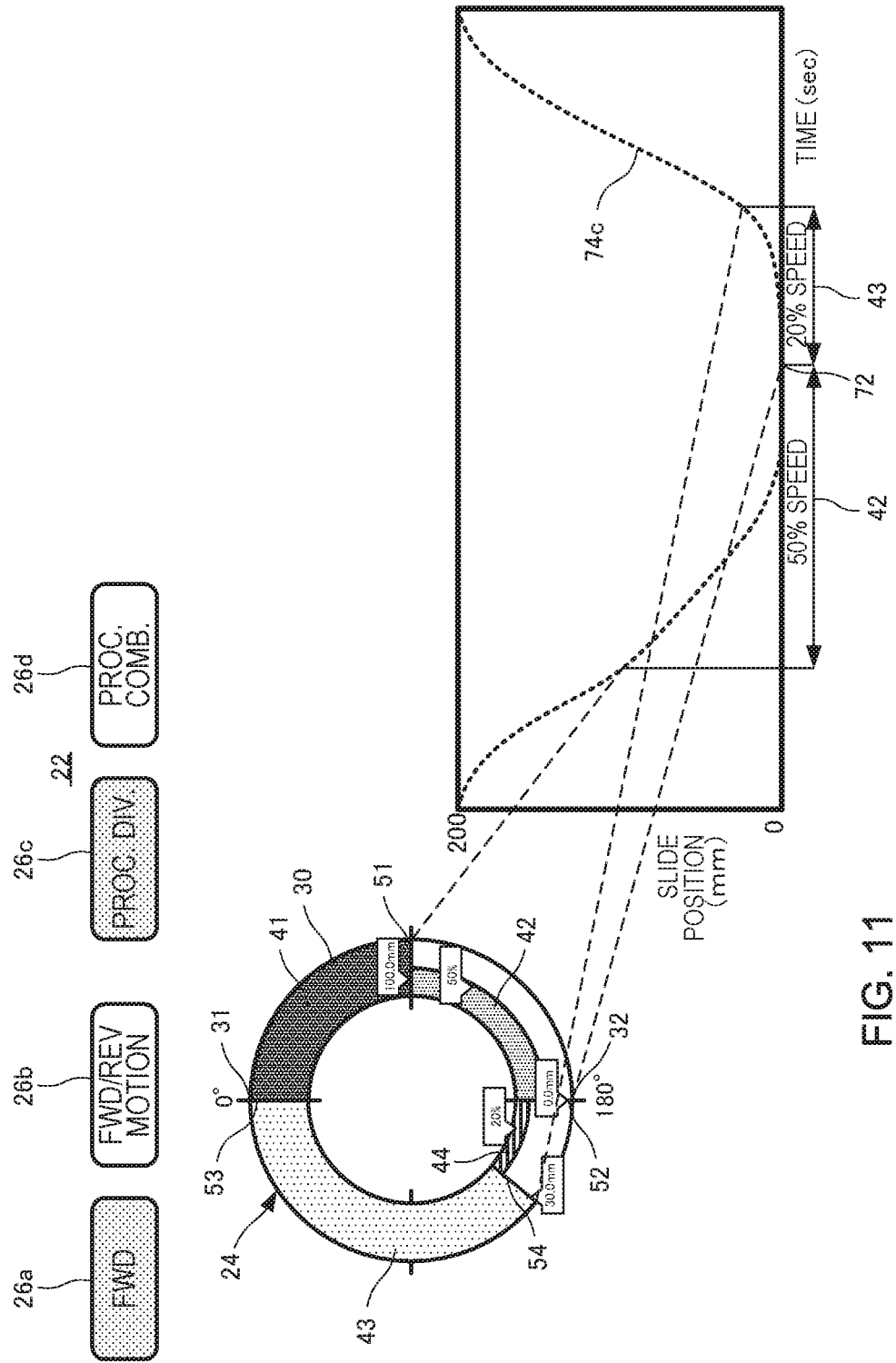
FIG. 11 is a diagram illustrating a specific example of a motion of a slide in a forward operation of a servo press machine according to an embodiment of the invention.

An operation of setting the motion of the slide 3 corresponding to a forward operation of the eccentric mechanism 4 will be described with reference to FIGS. 4 to 11. FIGS. 4 to 7 are diagrams each illustrating the image 24 for setting the forward operation which is displayed on the display unit 22 of the press machine 1. FIG. 8 is a diagram illustrating an operation of dividing the strip-shaped region 30 which is displayed on the display unit 22 of the press machine 1. FIGS. 9 and 10 are diagrams each illustrating the motion of the slide 3 in the forward operation of the press machine 1. FIG. 11 is a diagram illustrating a specific example of the motion of the slide 3 in the forward operation of the press machine 1.

As illustrated in each of FIGS. 4 to 7, on the display unit 22, the image 24 of the annular strip-shaped region 30 and images of a plurality of buttons (26a to 26e) are displayed.

Figure 4:
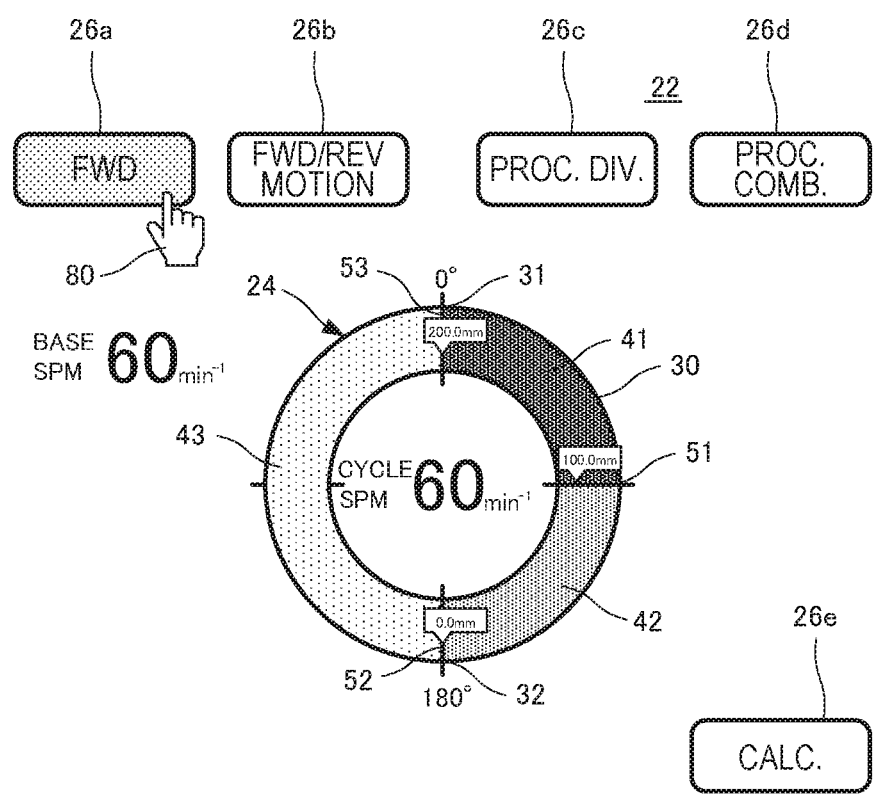
FIG. 4 is a diagram illustrating an image for setting a forward operation which is displayed on a display unit of a servo press machine according to an embodiment of the invention.

When a finger 80 of the operator touches (taps on) the forward operation selection button 26a in FIG. 4, the motion in the forward operation is selected, and the image 24 is displayed on the display unit 22. "BASE SPM" represents a reference SPM (the number of strokes per minute) in the motion of the slide 3 in the forward operation of the press machine 1, while "CYCLE SPM" represents a SPM in the displayed strip-shaped region 30.

The strip-shaped region 30 illustrated in FIG. 4 corresponds to the image 24 in an initial state. The strip-shaped region 30 includes the two slide operation regions provided between the top dead center 70 (FIG. 1) and the bottom dead center 72 (FIG. 1), i.e., the first slide operation region 41 and the second slide operation region 42 and the one slide operation region provided between the bottom dead center 72 and the top dead center 70, i.e., the third slide operation region 43. The first to third slide operation regions 41 to 43 correspond to the forward operation of the eccentric mechanism 4. The second slide operation region 42 has the lower end 32 as one end thereof. Since the slide operation region 42 has the lower end 32 of the strip-shaped region 30 as one end thereof, it is possible to set a characteristic press motion in the vicinity of the bottom dead center 72. Examples of the characteristic press motion include a press motion which reduces impact on contact between the upper die and a worked material and a press motion which prevents hopping of a product pushed back by a die cushion. By allowing the strip-shaped region 30 in the initial state to represent a motion generally used as the motion of the slide 3 in the forward operation of the eccentric mechanism 4, the operator is allowed to easily set the motion of the slide 3.

The upper end 31 of the strip-shaped region 30 has the third boundary 53 where 200.0 mm is displayed as the height (height of the ascent limit 11 from the descent limit 12 in FIG. 1) of the slide 3. The lower end 32 of the strip-shaped region 30 has the second boundary 52 where 0.0 mm is displayed as the height of the slide 3.

The first to third slide operation regions 41 to 43 are displayed in different colors to allow the operator to clearly recognize each of the slide operation regions.

The first boundary 51 is at a position at 90 degrees from the upper end 31 along the annular strip-shaped region 30 where 100.0 mm is displayed as the height position of the slide 3.

Figure 5:
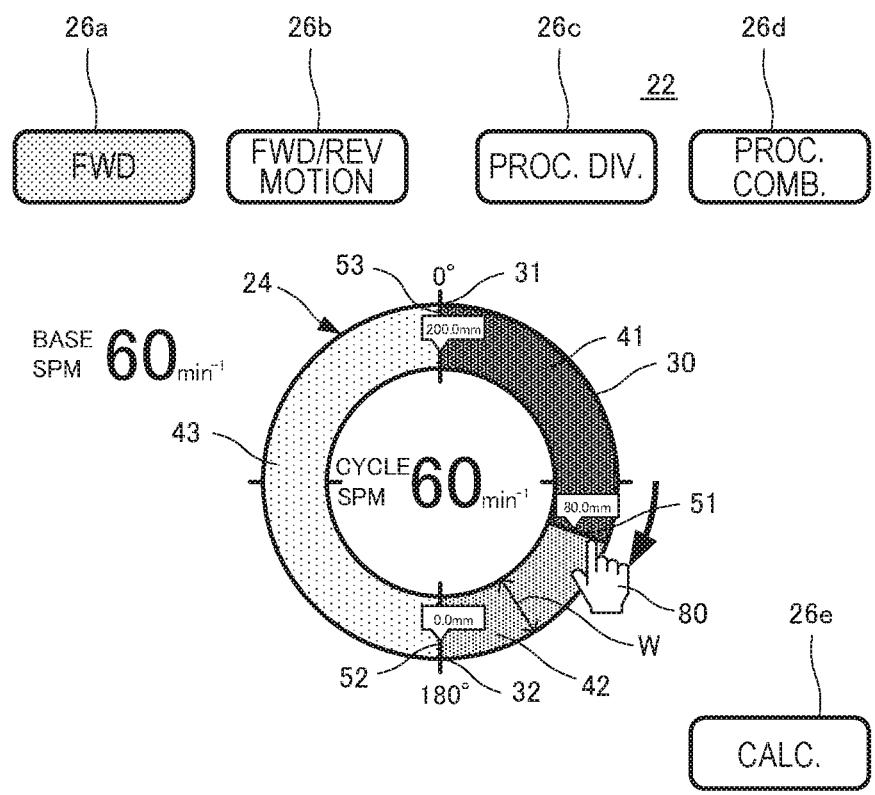
FIG. 5 is a diagram illustrating an image for setting a forward operation which is displayed on the display unit of a servo press machine according to an embodiment of the invention.

As illustrated in FIG. 5, when the operator moves (swipes) the finger 80 in the direction of the arrow while touching the first boundary 51, the first boundary 51 is moved along the direction in which the strip-shaped region 30 extends. As a result, the first slide operation region 41 is elongated, while the second slide operation region 42 is shortened. The position of the first boundary 51 has shifted to 80.0 mm, and settings are made such that the second slide operation region 42 begins at the position where the height of the slide 3 is 80.0 mm. The following will mainly describe an operation method using the finger 80 of the operator, but another input means such as a mouth may also be used.

In the initial state in FIG. 4, all the slide operation regions (41, 42, and 43) displayed therein have largest widths (corresponding to the width of the strip-shaped region 30). The width of each of the slide operation regions (41, 42, and 43) represents the percentage of the objective speed of the slide 3 in each of the regions. The objective speed is a target value to which the moving speed of the slide 3 is to be controlled in each of the slide operation regions (41, 42, and 43). Accordingly, the maximum width W represents the maximum speed (100%) of the slide 3.

Figure 6:
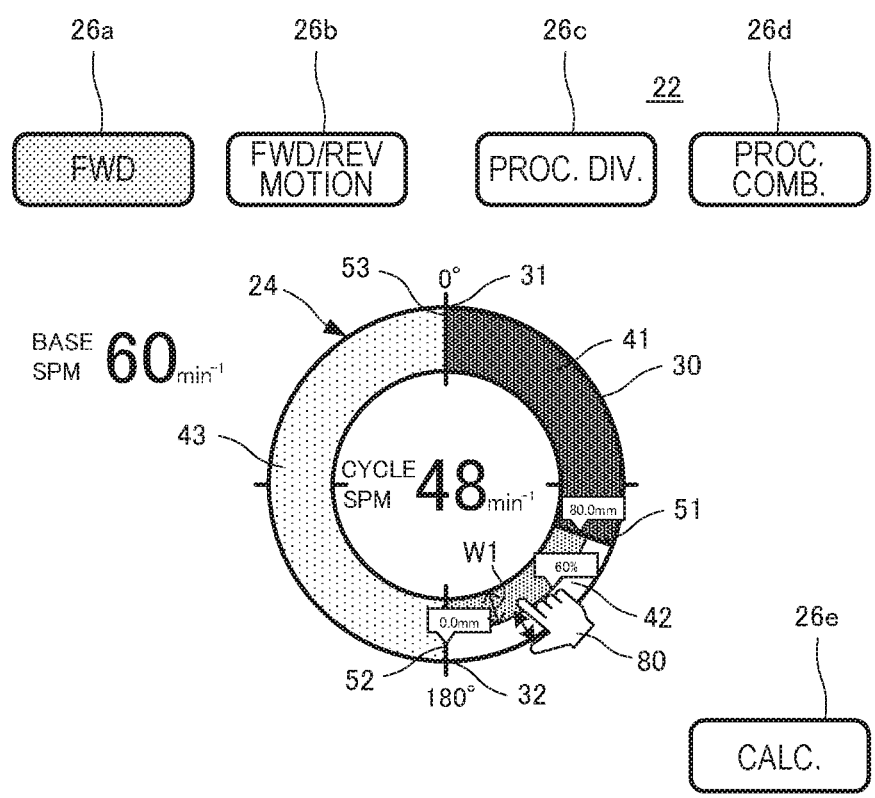
FIG. 6 is a diagram illustrating an image for setting a forward operation which is displayed on the display unit of a servo press machine according to an embodiment of the invention.

As illustrated in FIG. 6, when the operator moves the finger 80 (by performing a pinch-in gesture) in the direction of the arrow while touching the second slide operation region 42 so as to reduce the width of the second slide operation region 42 or when the operator moves (swipes) the finger 80 toward the inner peripheral edge of the second slide operation region 42 while touching the outer peripheral edge thereof, the width of the second slide operation region 42 is reduced from the maximum width W (FIG. 5) to a changed width W1. When the changed width W1 is to be changed to the maximum width W, the operator performs a pinch-out gesture or swipes the finger 80 in the opposite direction. The width of the second slide operation region 42 is reduced herein from the maximum width W to achieve 60% of the maximum speed. By thus changing the width of the second slide operation region 42 during the input operation on the operation unit 60, it is possible to set the speed of the slide 3 in the second slide operation region 42. In each of the first slide operation region 41 and the third slide operation region 43 also, the speed can similarly be set. Since each of the widths of the first to third slide operation regions 41 to 43 corresponds to the set speed of the slide 3, the operator is allowed to set the motion, while visually recognizing a speed change. Note that a method of displaying the speed is not limited to displaying the image in which each of the widths is changed. The speed may also be displayed by such a method as displaying numerical value information on each of the slide operation regions (41, 42, and 43). When the finger 80 touches the calculation button 26e, the calculation unit 62 calculates the SPM in one cycle in which the speed of the slide 3 in the second slide operation region 42 becomes 60% and displays "48 $min^{-1}$".

Figure 7:
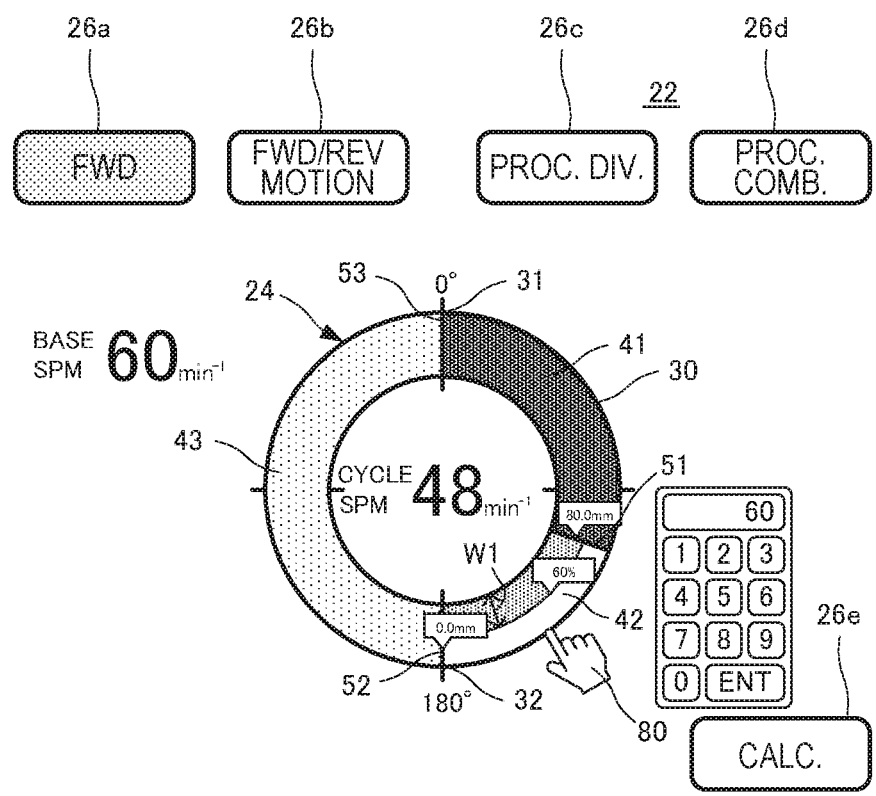
FIG. 7 is a diagram illustrating an image for setting a forward operation which is displayed on the display unit of a servo press machine according to an embodiment of the invention.

As illustrated in FIG. 7, the speed of the slide 3 in the second slide operation region 42 can also be changed by, instead of performing the operation in FIG. 6, touching the second slide operation region 42 with the finger 80 and then displaying a keyboard on the display unit 22 and inputting the percentage of the speed (e.g., "60") thereto.

As illustrated in FIG. 8, when the operator touches the process division button 26c with the finger 80, the third slide operation region 43 is divided as illustrated in the left middle portion so that a fourth slide operation region 44 is displayed. Then, every time the operator touches the process division button 26c, a fifth slide operation region 45 and a sixth slide operation region 46 are displayed so that at most six slide operation regions obtained by equally dividing the strip-shaped region 30 are allowed to be displayed. For each of the first slide operation region 41, the third slide operation region 43, and the fourth to sixth slide operation regions 44 to 46, the speed of the slide 3 can be set in the same manner as set for the second slide operation region 42.

When the operator touches the process combine button 26d, from the strip-shaped region 30 in the initial state illustrated in the upper right portion of FIG. 8, the second slide operation region 42 disappears as illustrated in the upper left portion of the FIG. 8 so that the strip-shaped region 30 halved into the first slide operation region 41 and the third slide operation region 43 is displayed. In the case of the other strip-shaped region 30 in FIG. 8, an operation opposite to the division operation can be performed.

Thus, in the strip-shaped region 30, the number of the slide operation regions (41 to 46) can be increased or reduced in accordance with the input operation on the operation unit 60. By increasing or decreasing the slide operation regions (41 to 46), it is possible to set a more complicated motion.

The broken line in FIG. 9 shows a forward operation curve 74a (motion of the slide 3) in the initial state which represents the motion of the slide 3 in accordance with the strip-shaped region 30 in FIG. 4. The ordinate gives the position (mm) of the slide 3, while the abscissa gives a time (sec). In the forward operation curve 74a in the initial state, since the servo motor 7 rotates at the 100% speed to rotate the crankshaft 5, an objective motion is represented by a sine wave trajectory in which the slide 3 moves from the top dead center 70 of the crankshaft 5 to the bottom dead center 72 and returns therethrough to the top dead center 70.

The broken line in FIG. 10 shows an operation curve 74b after a speed change in FIG. 6. The operation curve 74b represents the motion in one cycle in which the first boundary 51 in FIG. 5 is lowered to set the speed in the second slide operation region 42 to 60% in FIG. 6.

The press machine 1 operates in accordance with motion data of the slide 3 based on the image 24 thus set on the display unit 22.

Thus, the operator of the press machine 1 is allowed to set the motion of the slide 3, while visually recognizing a press working operation based on the rotation of the crankshaft 5 by the servo motor 7 by using the strip-shaped region 30. Specifically, by replacing the upper end 31 of an annular image 204 with the top dead center 70 of the crankshaft 5 and replacing the lower end 32 thereof with the bottom dead center 72, the operator is allowed visually recognize the rotating movement of the crankshaft 5 and set the motion of the slide 3.

A specific example of the setting of the motion of the slide 3 will be described with reference to FIG. 11. In FIG. 11, in the strip-shaped region 30 in the image 24, the fourth slide operation region 44 results from the division of the third slide operation region 43 caused by tapping on the process division button 26c and is displayed at the lower end 32. In addition, in FIG. 11, the respective widths of the second slide operation region 42 and the fourth slide operation region 44 are changed. The motion of the slide 3 set using the strip-shaped region 30 in the image 24 is illustrated as an operation curve 74c after the division/change on the right side of FIG. 11.

In FIG. 11, in the second slide operation region 42, the descending speed of the slide 3 is set to decrease shortly before working start timing so as to reduce impact on contact between the upper die attached to the slide 3 and a material to be worked placed in the lower die over the bolster 2. In this example, the descending speed of the slide 3 is set to decrease to 50% of the maximum speed.

In the fourth slide operation region 44 (between the second boundary 52 of the lower end 32 and a fourth boundary 54), the ascending speed of the slide 3 is further reduced compared to the speed in the second slide operation region 42. In this example, the ascending speed of the slide 3 is set to decrease to 20% of the maximum speed. By thus setting the ascending speed of the slide 3, it is expected to prevent the hopping of a product pushed back by the die cushion and a flaw in the product resulting from the contact between the product and the die.

The "hopping of the product" is as follows. The ascending motion of the upper die may be faster than the ascending motion of the product resulting from the push-back operation of the die cushion in the vicinity of the bottom dead center 72 (FIG. 1). As a result, a gap may be momentarily formed between the upper die and the product, resulting in the "hopping of the product".

The setting of the speed of the slide 3 in the vicinity of the bottom dead center 72 and the movement range (which is the second slide operation region 42 and the fourth slide operation region 44 in FIG. 11) of the slide 3 to which the speed is applied is particularly important in preventing defective forming in press working and a reduction in working yield. Accordingly, it is particularly preferable to allow visual recognition of the relationship between the position and the speed of the slide 3 as allowed by an input interface such as the image 24.

3. Forward/Reverse Motion

The operation of setting the motion of the slide 3 corresponding to the forward/reverse motion of the eccentric mechanism 4 will be described with reference to FIGS. 12 to 16. FIGS. 12 to 15 are diagrams each illustrating the image 204 for setting the forward/reverse motion which is displayed on the display unit 22 of the press machine 1. FIG. 16 is a diagram illustrating the motion of the slide 3 in the forward/reverse motion of the press machine 1.

Figure 12:
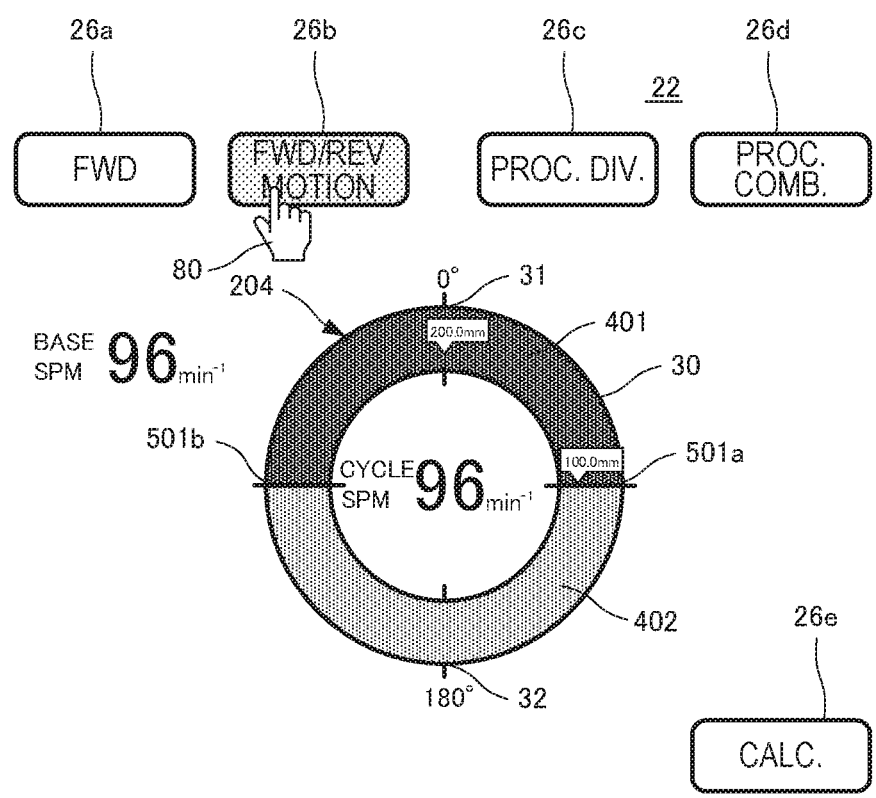
FIG. 12 is a diagram illustrating an image for setting a forward/reverse motion which is displayed on a display unit of a servo press machine according to an embodiment of the invention.

As illustrated in FIG. 12, when the operator touches (taps on) the forward/reverse motion selection button 26b with the finger 80, the motion in the forward/reverse motion is selected, and the image 24 is displayed on the display unit 22. The forward/reverse motion is an operation in which the crankshaft 5 performs reciprocating rotation like a pendulum through the bottom dead center 72 serving as a center position without rotating to the top dead center 70. In the case of the forward/reverse motion, the slide 3 descends and ascends without ascending to the ascent limit 11 (FIG. 1) so that a cycle time is reduced to improve the productivity of the press machine 1.

In the image 204 displayed on the display unit 22, a strip-shaped region 300 in an initial state in FIG. 12 includes the upper and lower two slide operation regions corresponding to the forward/reverse motion of the eccentric mechanism 4, i.e., a first slide operation region 401 and a second slide operation region 402. The upper first slide operation region 401 corresponds the range in which the slide 3 does not operate. Specifically, since the crankshaft 5 moves backward at 90 degrees and 270 degrees which correspond to first boundaries 501a and 501b and rotates only within the range of the second slide operation region 402, the slide 3 performs the ascending/descending motions only within the range of the second slide operation region 402. By allowing the strip-shaped region 300 in the initial state to represent the motion generally used as the motion of the slide 3 in the forward/reverse motion of the eccentric mechanism 4, the operator is allowed to easily set the motion of the slide 3.

Figure 13:
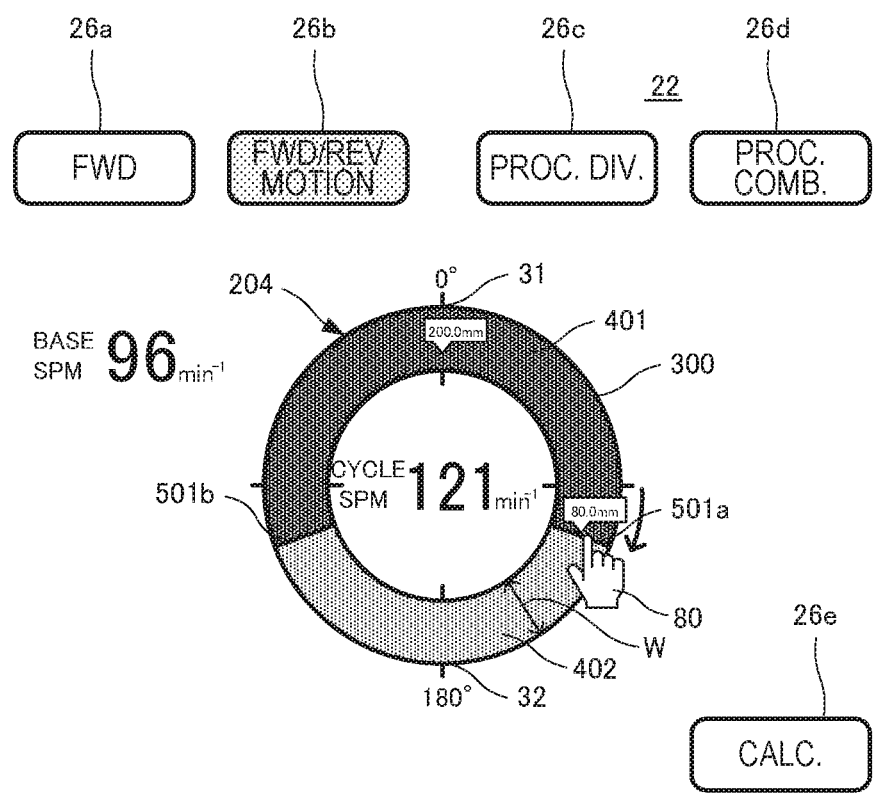
FIG. 13 is a diagram illustrating an image for setting a forward/reverse motion which is displayed on a display unit of a servo press machine according to an embodiment of the invention.

As illustrated in FIG. 13, when the operator moves (swipes) the finger 80 in the direction of the arrow while touching the first boundary 501a, the height of the first boundary 501a which is 100.0 mm in the initial state in FIG. 12 is moved to 80.0 mm. At the same time, the first boundary 501b is also moved to a height of 80.0 mm. This is because, in the forward/reverse motion, the motion of the slide 3 in the second slide operation region 402 reciprocates between the same heights. When the operator touches the calculation button 26e, the cycle SPM is calculated to be "121 min$^{-1}$" and displayed.

Figure 14:
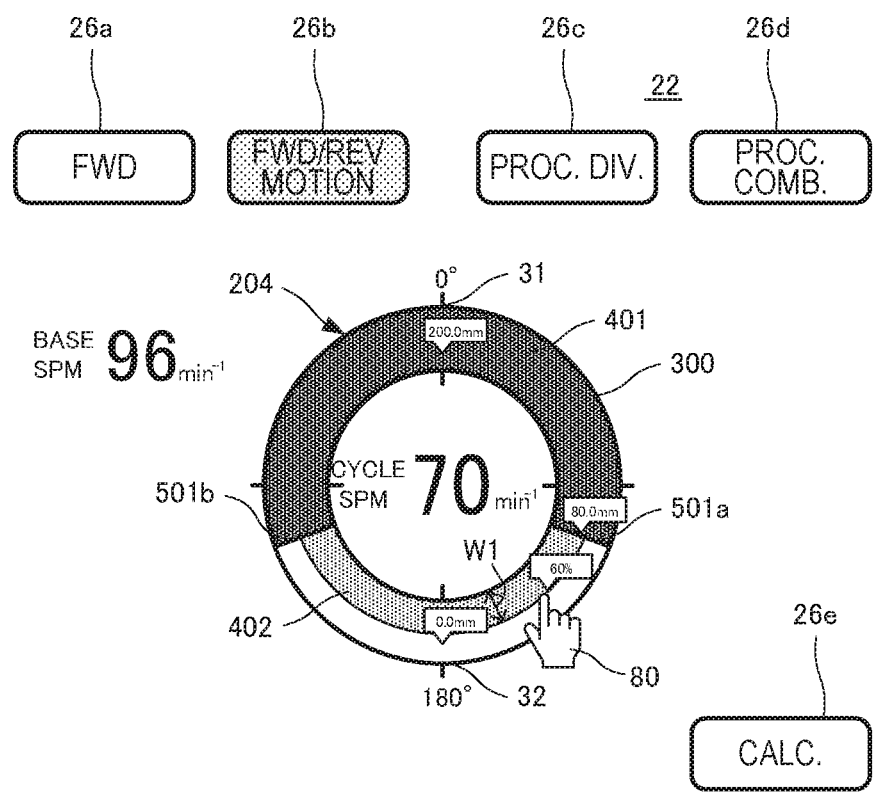
FIG. 14 is a diagram illustrating an image for setting a forward/reverse motion which is displayed on a display unit of a servo press machine according to an embodiment of the invention.

As illustrated in FIG. 14, when the operator moves the finger 80 (by performing a pinch-in gesture) while touching the second slide operation region 402 so as to reduce the width of the second slide operation region 402 in the direction of the arrow or when the operator moves (swipes) the finger 80 toward the inner peripheral edge of the second slide operation region 402 while touching the outer peripheral edge thereof, the width of the second slide operation region 402 is reduced from the maximum width W (FIG. 5) to the changed width W1. The width of the second slide operation region 402 is reduced herein from the maximum width W to achieve 60% of the maximum speed. When the operator touches the calculation button 26e, the cycle SPM is calculated to be "70 min$^{-1}$" and displayed.

Figure 15:
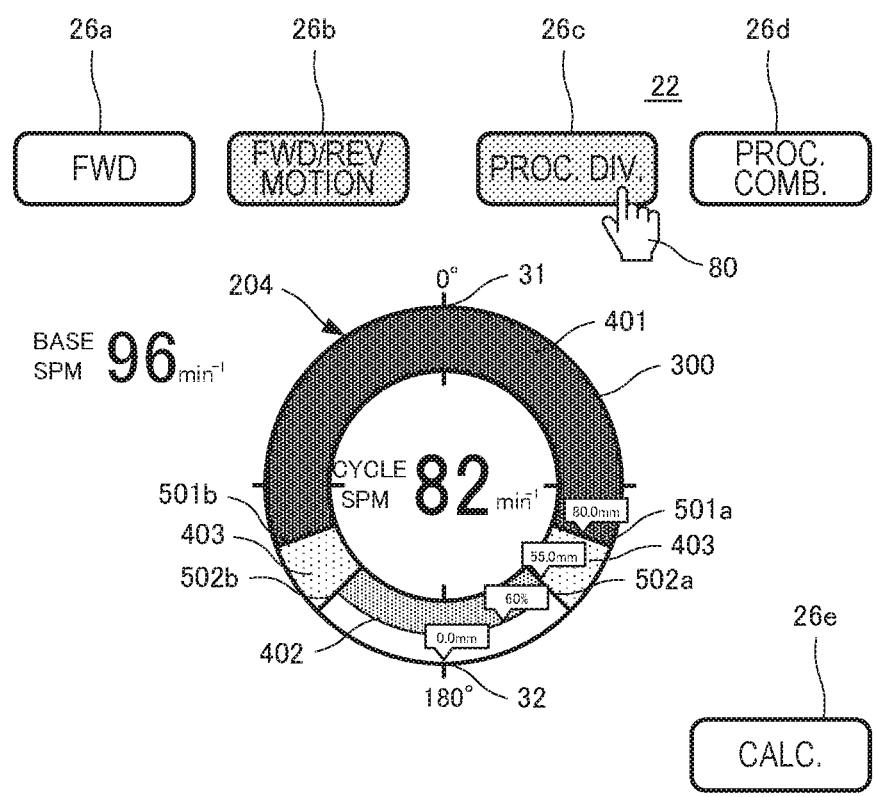
FIG. 15 is a diagram illustrating an image for setting a forward/reverse motion which is displayed on a display unit of a servo press machine according to an embodiment of the invention.
Figure 16:
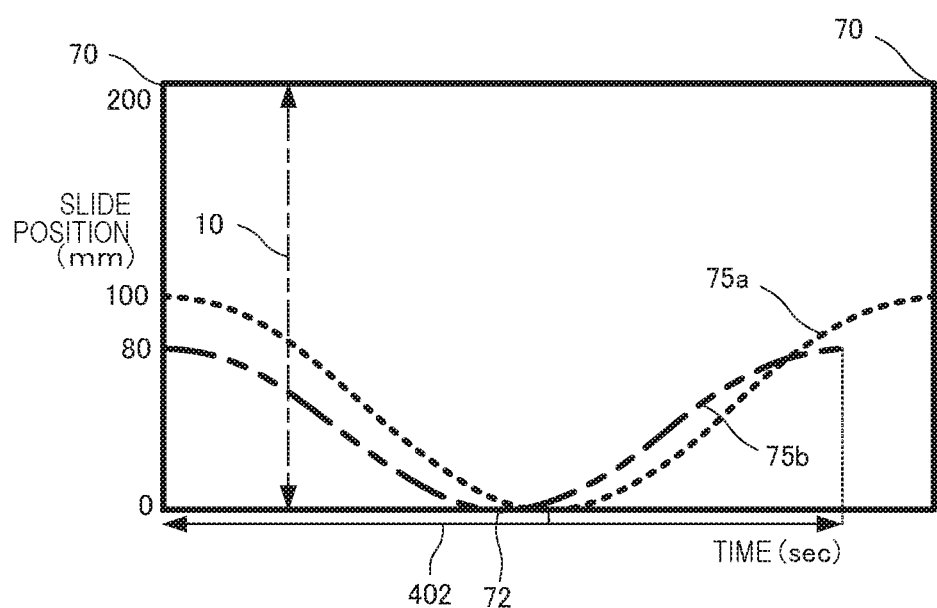
FIG. 16 is a diagram illustrating a motion of a slide in a forward/reverse motion of a servo press machine according to an embodiment of the invention.

As illustrated in FIG. 15, when the finger 80 touches the process division button 26c, the second slide operation region 402 is divided so that the two third slide operation regions 403 are displayed at the both ends of the second slide operation region 402. When the maximum width W of one of the two separately displayed third slide operation regions 403 is changed, the width of the other third slide operation region 403 is similarly changed. When the position of a second boundary 502a as one of two second boundaries is moved along the direction in which the strip-shaped region 300 extends, a second boundary 502b as the other second boundary is also moved to the same height. It is also possible to more finely divide the second slide operation region 402.

As illustrated in FIG. 16, a forward/reverse motion curve 75a in the initial state represents the motion of the slide 3 which operates in accordance with the strip-shaped region 300 in FIG. 12. An operation curve 75b after a forward/reverse stroke is changed represents the motion of the slide 3 which operates in accordance with the strip-shaped region 300 in FIG. 13. The movement range 10 of the slide 3, which is from a height of 0 mm to a height of 100 mm in the initial state in FIG. 12, is from the height of 0 mm to a height of 80 mm after the change in FIG. 13. The time required to set the second slide operation region 402 is accordingly reduced.

Thus, the operator of the press machine 1 is allowed to easily set the motion of the slide 3, while visually recognizing, by using the strip-shaped region 300, the forward/reverse motion of the crankshaft 5 through the bottom dead center 72 as the center position, which is enabled by the servo motor 7.

4. Stop-at-Bottom-Dead-Center Operation

Figure 17:
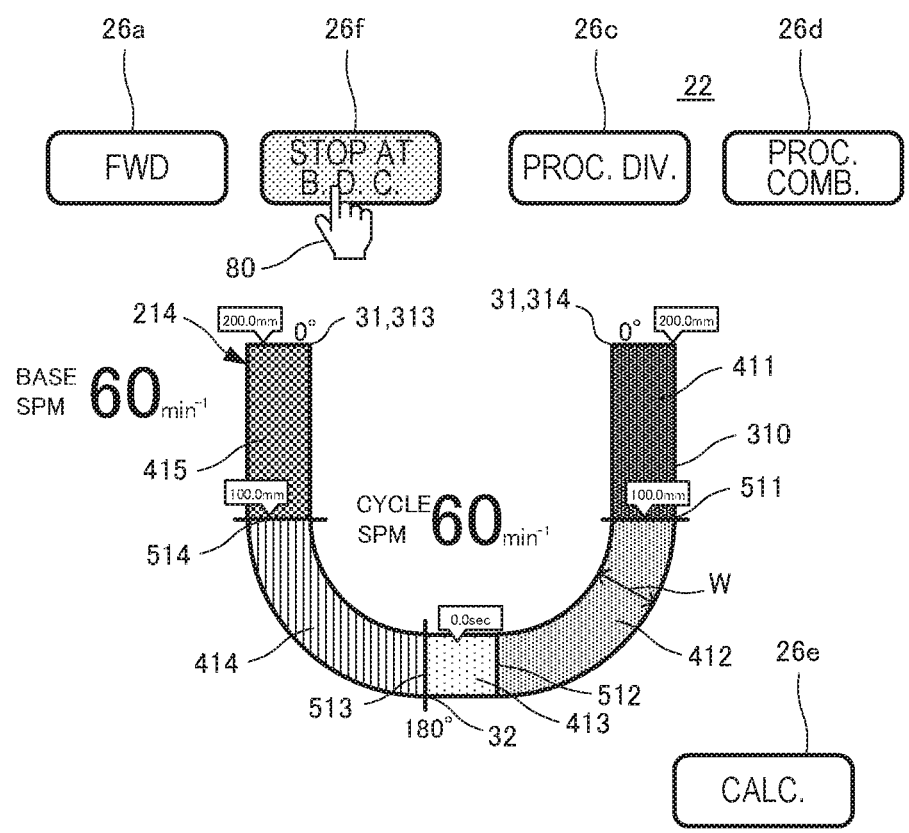
FIG. 17 is a diagram illustrating an image for setting a stop-at-bottom-dead-center operation which is displayed on a display unit of a servo press machine according to an embodiment of the invention.
Figure 18:
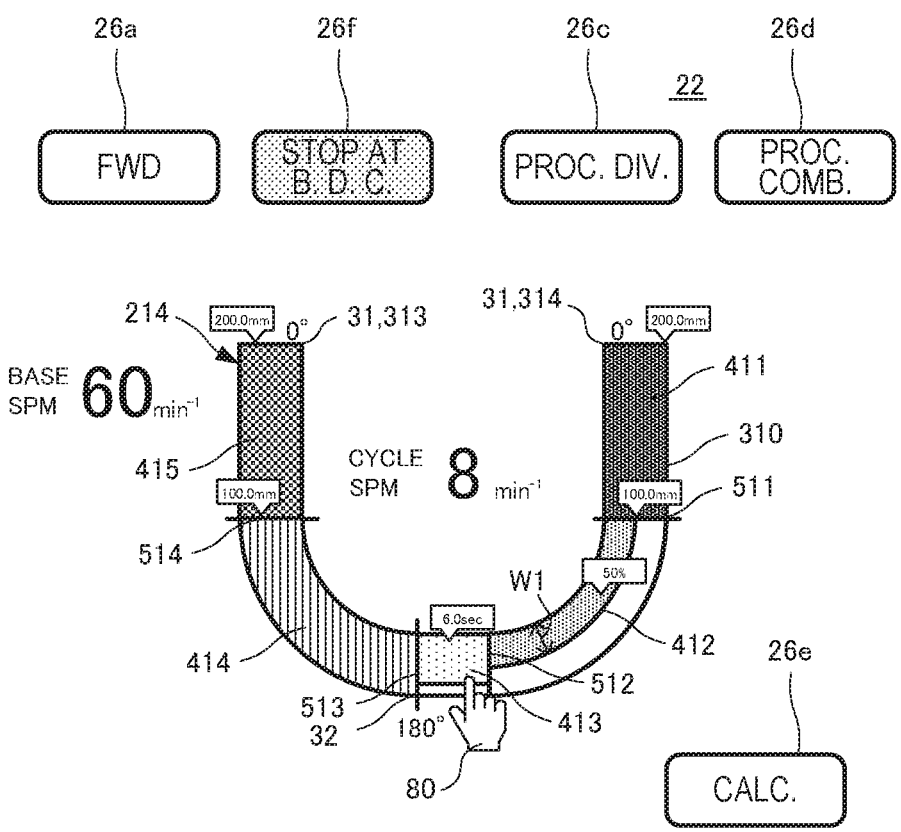
FIG. 18 is a diagram illustrating an image for setting a stop-at-bottom-dead-center operation which is displayed on a display unit of a servo press machine according to the embodiment of the invention.
Figure 19:
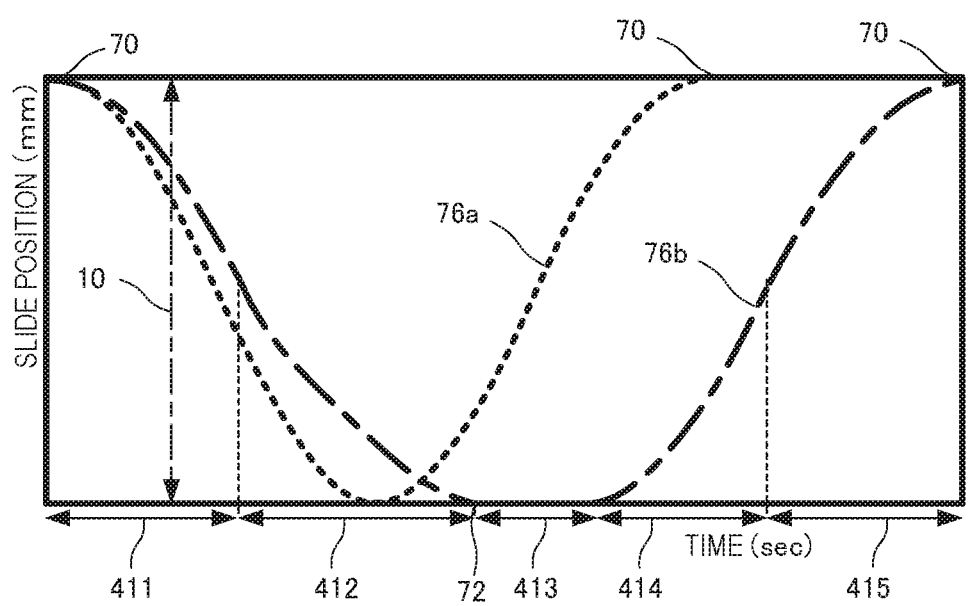
FIG. 19 is a diagram illustrating a motion of a slide in the stop-at-bottom-dead-center operation in a servo press machine according to an embodiment of the invention.

The operation of setting the motion of the slide 3 in a stop-at-bottom-dead-center operation will be described with reference to FIGS. 17 to 19. FIGS. 17 and 18 are diagrams each illustrating an image 214 for setting the stop-at-bottom-dead-center operation of the press machine 1 which is displayed on the display unit 22. FIG. 19 is a diagram illustrating the motion of the slide 3 in the stop-at-bottom-dead-center operation of the press machine 1.

As illustrated in FIG. 17, when the operator touches (taps on) a stop-at-bottom-dead-center operation selection button 26f with the finger 80, the motion in the stop-at-bottom-dead-center operation is selected, and the image 214 is displayed on the display unit 22. The stop-at-bottom-dead-center operation is the motion of the slide 3 in which the crankshaft 5 stops at the bottom dead center 72 for a given period and then performs a forward operation.

A strip-shaped region 310 is represented by the one strip-shaped image 214. The image 214 has both ends 313 and 314 thereof at positions away from each other. The image 214 extends downward from one end 313 of the both ends 313 and 314 to be bent upward at the lower end 32 and reach the other end 314.

The both ends 313 and 314 correspond to the ascent limit 11 of the slide 3, while the lower end 32 corresponds to the descent limit 12 of the slide 3. The lower end 32 has at least one third slide operation region 413 extending in the horizontal direction. By using the image 214 of the strip-shaped region 310 thus configured, the operator is allowed to set the motion of the slide 3 in which the slide 3 is temporarily stopped at the bottom dead center 72, while visually recognizing the slide motion.

The strip-shaped region 310 has a substantially U-shaped shape. The two upper ends 31 of the strip-shaped region 310 serve as the both ends 313 and 314 disposed on left and right sides to be spaced apart from each other. In the strip-shaped region 310, a first slide operation region 411, a second slide operation region 412, a third slide operation region 413, a fourth slide operation region 414, and a fifth slide operation region 415 are consecutively arranged from the upper right side along the direction in which the strip-shaped region 310 extends.

As illustrated in FIG. 18, in each of the slide operation regions (411 to 415), by changing the maximum width W, the speed of the slide 3 can be set in the same manner as in the example in FIG. 4. An objective speed of the slide 3 in the second slide operation region 412 is changed herein to 50%. By inwardly sliding (swiping) the finger 80 from the outside while touching the third slide operation region 413 or by moving the finger 80 (by performing a pinch-in gesture) so as to reduce the third slide operation region 413, the operator is allowed to change the time period during which the slide 3 is stopped at the bottom dead center 72 (FIG. 1) of the crankshaft 5 (from 0.0 sec to 6.0 sec). When the operator touches (taps on) the calculation button 26e, the cycle SPM is calculated to be 8 min$^{-1}$ and displayed on the display unit 22.

As illustrated in FIG. 19, a forward operation curve 76a in the initial state which represents the motion of the slide 3 in FIG. 17 is changed as illustrated in FIG. 18 to an operation curve 76b representing the motion of the slide 3 in the stop-at-bottom-dead-center operation.

The operator of the press machine 1 is allowed to easily set the motion of the slide 3, while visually recognizing a stopped state at the bottom dead center 72 by using the strip-shaped region 310.

5. Two-Passes-Through-Bottom-Dead-Center Operation

Figure 20:
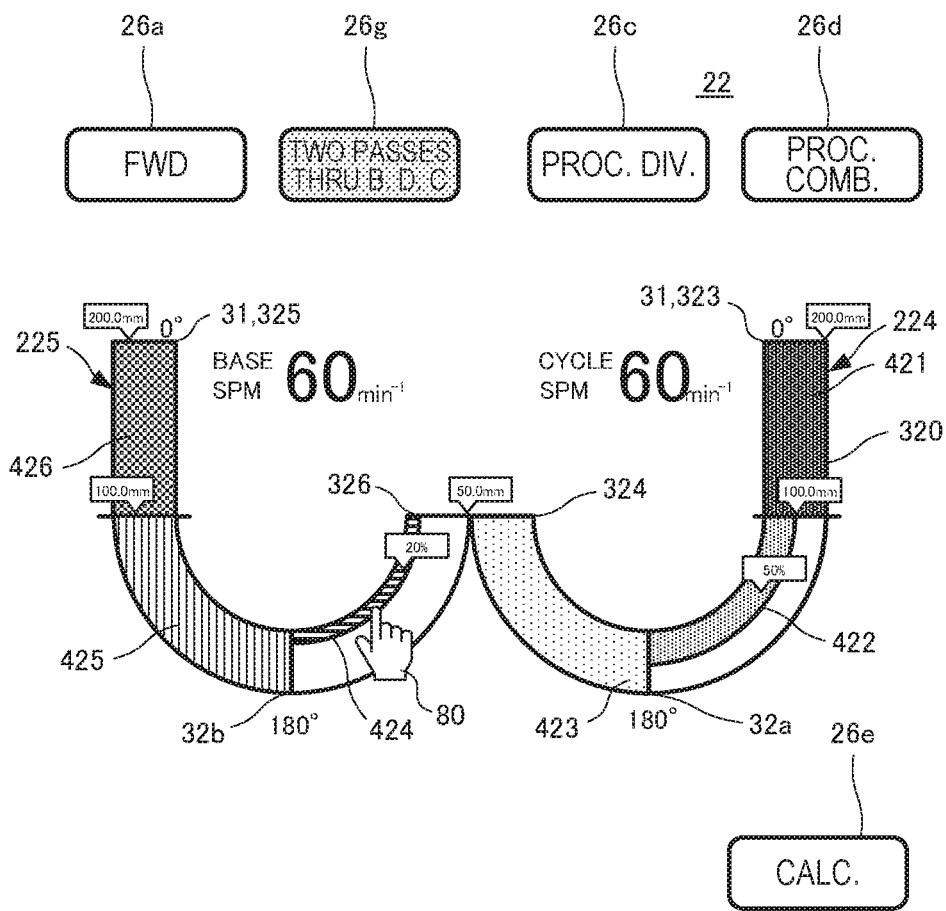
FIG. 20 is a diagram illustrating an image for setting a two-passes-through-bottom-dead-center operation which is displayed on a display unit of a servo press machine according to an embodiment of the invention.
Figure 21:
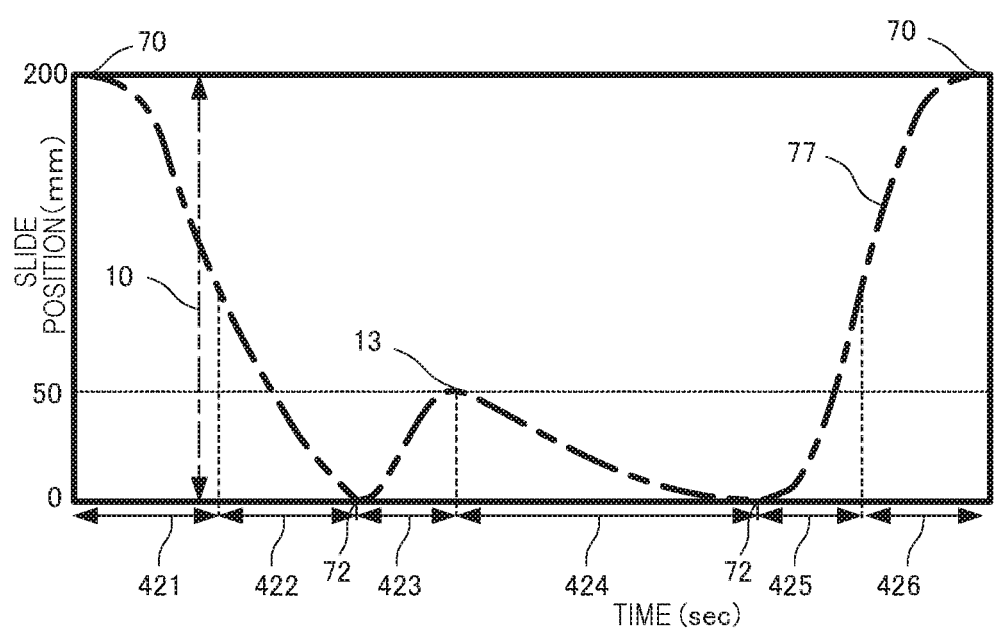
FIG. 21 is a diagram illustrating a motion of a slide in a two-passes-through-bottom-dead-center operation in a servo press machine according to an embodiment of the invention.

An operation of setting the motion of the slide 3 in a two-passes-through-bottom-dead-center operation will be described with reference to FIGS. 20 and 21. FIG. 20 is a diagram illustrating images 224 and 225 for setting the two-passes-through-bottom-dead-center operation which are displayed on the display unit 22 of the press machine 1. FIG. 21 is a diagram illustrating the motion of the slide 3 in the two-passes-through-bottom-dead-center operation of the press machine 1. In the motion, even when springback of a worked material occurs after press forming resulting from a first descending motion of the slide 3, the springback can be reduced by press forming (a restrike in the same die) resulting from a second descending motion of the slide 3.

As illustrated in FIG. 20, when the operator touches (taps on) a two-passes-through-bottom-dead-center button operation selection button 26g with the finger 80, the motion in the two-passes-through-bottom-dead-center operation is selected, and the images 224 and 225 are displayed on the display unit 22. In the two-passes-through-bottom-dead-center operation, the slide 3 is caused to descend to the descent limit 12 (bottom dead center 72) twice in one cycle to effect press working.

The strip-shaped region 320 is represented by the two adjacent strip-shaped images 224 and 225. The images 224 and 225 have respective one ends 323 and 325 (upper ends 31) thereof corresponding to the ascent limit 11 (FIG. 1) of the slide 3 and respective other ends 324 and 326 corresponding to the point of reversal 13 (FIG. 21) at a position to which the slide 3 has ascended through the descent limit 12 (FIG. 1). The two strip-shaped images 224 and 225 are combined together such that the other ends 324 and 326 are adjacent to each other. By thus using the images 224 and 225 of the strip-shaped region 320, the operator is allowed to set a so-called two-passes-through-bottom-dead-center motion of the slide 3, while visually recognizing the slide motion.

The strip-shaped region 320 has a form obtained by horizontally reversing one of the two adjacent J-shaped images 224 and 225. The first descending motion of the slide 3 is set using the first slide operation region 421 extending from the end 323 of the image 224 on the upper right side and the second slide operation region 422. The ascending motion of the slide 3 is set using the range extending from the lower end 32 on the right side of FIG. 20 which corresponds to the descent limit 12 to an end 324 of the third slide operation region 423. Then, the second descending motion is set using the fourth slide operation region 424 extending from the end 326 of the left image 225. The second ascending motion of the slide 3 is set using the range extending from the lower end 32 on the left side of FIG. 20 which corresponds to the descent limit 12 to the end 325 of the sixth slide operation region 426 through the fifth slide operation region 425.

Each of the slide operation regions (421 to 426) can be divided using the process division button 26c and can be combined using the process combine button 26d. An objective speed of the slide 3 in each of the slide operation regions (421 to 426) can be changed as described using FIGS. 6, 7, and the like.

FIG. 20 illustrates a state after the operator changed the widths of the second slide operation region 422 and the fourth slide operation region 424 in the initial state (where each of the slide operation regions (421 to 426) had the maximum speed (100%)) by performing a pinch-in gesture using the finger 80.

As illustrated in FIG. 21, the motion of the slide 3 set in FIG. 20 can be represented as a two-passes-through-bottom-dead-center operation curve 77. The two-passes-through-bottom-dead-center operation curve 77 shows the motion of the slide 3 which has descended from the top dead center 70, begins to ascend at the bottom dead center 72, begins to descend again at the point of reversal 13, and then begins to ascend again at the bottom dead center 72.

It may also be possible to allow the motion diagrams of FIGS. 9, 10, 16, 19, and 21 to be displayed on the display unit 22 at the stage where the settings performed using the strip-shaped regions 30, 300, 310, and 320 are changed so as to allow the operator to recognize the change.

The operator of the press machine 1 is allowed to easily set the motion of the slide 3 in the strip-shaped region 320, while visually recognizing the two-passes-through-bottom-dead-center operation.

6. Selection of Motion

In the press machine 1 illustrated in FIG. 2, the storage unit 64 stores the respective forms of the plurality of strip-shaped regions 30, 300, 310, and 320. The display unit 22 selects any one of the plurality of strip-shaped regions 30, 300, 310, and 320 from the storage unit in accordance with the input operation on the operation unit 60 and displays the selected strip-shaped region. The input operation on the operation unit 60 may also be performed such that, e.g., the forward/reverse motion selection button 26b illustrated in FIGS. 4 to 7 is held down to cause the display unit 22 to display the stop-at-bottom-dead-center button 26f or the two-passes-through-bottom-dead-center button operation selection button 26g and allow the operator to press the button (26f or 26g). By preparing the plurality of strip-shaped regions 30, 300, 310, and 320 in advance in the storage unit 64, the operation panel 20 is allowed to flexibly respond to the setting of the plurality of types of motions.

The types of the strip-shaped regions 30, 300, 310, and 320 stored in the storage unit 64 are not limited to those described in the above embodiment. A strip-shaped region of another type can be prepared in accordance with another motion.

7. Setting Method for Press Machine

A method of setting the press machine 1 described with reference to FIGS. 1 to 21 will be described below.

A method according to an embodiment of the invention is a method for setting the press machine 1 by using the operation panel 20 of the press machine 1 described above. The operator of the press machine 1 performs an input operation on the strip-shaped regions 30, 300, 310, and 320 displayed on the display unit 22 of the operation panel 20.

For the input operation, an operation method can be used in which the operator touches the touch-panel operation unit 60 on the display unit 22 with the finger 80 and performs gestures used on smartphones such as tap, pinch-in, pinch-out, and swipe. For the input operation, the second operation unit 61 described above or another known device may also be used. For example, it may also be possible to perform the input operation using such a keyboard image as illustrated in FIG. 7 or perform the operation on the image 24, 204, 214, 224, or the like by performing a gesture such as clicking, dragging, or dropping on a cursor displayed on the display unit 22 using a mouth.

By the input operation performed by the operator, the boundaries (such as 51, 52, and 53) between the plurality of slide operation regions (such as 41, 42, 43, 44, 45, and 46) which are provided in the strip-shaped regions 30, 300, 310, and 320 and for each of which the speed of the slide 3 can be set are moved to set the height range of the slide 3 which operates at the speed set for each of the slide operation regions (such as 41, 42, 43, 44, 45, and 46). By moving the boundaries (such as 51, 52, and 53) between the slide operation regions (such as 41, 42, 43, 44, 45, and 46) for each of which the speed of the slide 3 is set, it is possible to set the height ranges of the slide 3 corresponding to the slide operation regions (such as 41, 42, 43, 44, 45, and 46). This allows the operator to set the motion of the slide 3, while visually recognizing the slide motion after the setting.

To the present method, the above-mentioned operation for the press machine 1 is applicable.

The invention is not limited to the above-described embodiments, and various modifications can be made. The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A control apparatus for a servo press machine that performs press working by using an eccentric mechanism that converts a rotary movement to a linear movement to convert rotation of a servo motor to a reciprocating linear movement of a slide, the control apparatus comprising:
   a display that displays a strip-shaped region for setting a motion of the slide;
   an user interface that receives an input operation; and
   a processor programmed to control the display to display the strip-shaped region in accordance with the input operation from the user interface,
   wherein the strip-shaped region has a range that extends from an upper end of the strip-shaped region to a lower end of the strip-shaped region and that represents a movement range of the slide in the linear movement,
   wherein the range of the strip-shaped region is divided into slide operation regions that are consecutive in a direction in which the strip-shaped region extends, the slide operation regions each representing a motion setting of the slide in a corresponding part of the range of the strip-shaped regions,
   wherein when the user interface receives a request for adjusting a speed setting of the slide in one of the slide operation regions, the processor controls the display to vary a visual representation of the one of the slide operation regions based on the adjusted speed setting, and
   wherein the user interface receives a request for adjusting sizes of adjacent two of the slide operation regions when a boundary between the adjacent two of the slide operation regions is specified through the user interface, the processor controls the display to move the boundary along the direction in which the strip-shaped region extends to adjust the sizes of the adjacent two of the slide operation regions.

2. The control apparatus according to claim 1, wherein the strip-shaped region is represented by an annular image corresponding to a rotating operation of the eccentric mechanism and formed into an annular shape by arranging the slide operation regions each having an arc shape.

3. The control apparatus according to claim 2, wherein, in an initial state, the slide operation regions of the strip-shaped region include first and second slide operation regions provided in a region extending from a top dead center to a bottom dead center and a third slide operation region provided in a region extending from the bottom dead center to the top dead center, the first to third slide operation regions representing a forward operation of the eccentric mechanism.

4. The control apparatus according to claim 2, wherein,
   in an initial state, the slide operation regions of the strip-shaped region include upper and lower slide operation regions representing a forward/reverse motion of the eccentric mechanism, and
   the upper slide operation region represents a range in which the slide does not operate.

5. The control apparatus according to claim 1, wherein,
   the strip-shaped region is represented by one strip-shaped image having a first end, a second end, and a middle region extending between the first end and the second end, a middle region including a point,
   the first and second ends are disposed in an upper area of the display,
   the point in the middle region is disposed in a lower area of the display,
   the first and second ends each represent an ascent limit of the slide,
   the point represents a descent limit of the slide, and
   the strip-shaped region includes one slide operation region including the point, the one slide operation region extending in a horizontal direction in the lower area of the display.

6. The control apparatus according to claim 1, wherein
   the strip-shaped region is represented by first and second strip-shaped images arranged adjacent to each other, the first strip-shaped image having a first end, a second end, and a first middle region extending between the first end and the second end, the second strip-shaped image having a third end, a fourth end, and a second middle region extending between the third end and the fourth end,
   the first and third ends each represent an ascent limit of the slide, the second and fourth ends each represent a point of reversal at a position to which the slide has ascended through a descent limit thereof, and
   the first and second strip-shaped images are combined together at the second and fourth ends.

7. The control apparatus according to claim 1, wherein
   a number of the slide operation regions of the strip-shaped region is allowed to be increased or decreased in response to the input operation received by the user interface.

8. The control apparatus according to claim 1, wherein the processor controls the display to adjust a width of the one of the slide operation regions based on the adjusted speed setting.

9. The control apparatus according to claim 8, wherein
   the one of the slide operation regions has a first side and a second side opposite the first side, and another one of the slide operation regions, immediately adjacent to the one of the slide operation regions, has a third side and a fourth side opposite the third side, in an initial state, the first side and the third side are aligned with each other along the direction in which the strip-shaped region extends, and the second side and the fourth side are aligned with each other along the direction in which the strip-shaped region extends, and when the width of the one of the slide operation regions is adjusted, the processer controls the display to move one of the first and second sides closer to another one of the first and second sides.

10. The control apparatus according to claim 1, further comprising:

a storage that stores a plurality of strip-shaped regions including the strip-shaped region, wherein the processor selects one of the strip-shaped regions from the storage in response to the input operation received by the user interface and controls the display to display the selected strip-shaped region.

11. The control apparatus according to claim 1, wherein the user interface is a touch panel provided on the display, and the input operation received by the touch panel is a touch operation.

* * * * *